Patented Apr. 18, 1939

2,155,308

UNITED STATES PATENT OFFICE 2,155,308

PRESERVING CRAB MEAT

Sterling G. Harris, Centerville, Md., assignor to The Blue Channel Corporation, Centerville, Md., a corporation of Maryland No Drawing. Application October 4, 1938, Serial No. 233,195

8 Claims. (Cl. 99—188)

This invention relates to the preservation of crab meat, and is concerned particularly with the canning of the meat of the common edible crabs of the Atlantic and Gulf coasts of North America, variously known as the "blue", "rock", or "sand" crab, but, for convenience, hereinafter referred to as the "Atlantic" crab. The invention contemplates improvements in the packing process with a view to inhibiting discoloration of the canned meat.

The meat of the Atlantic crab tends to become discolored during and after cooking due to the fact that the body of the crab contains a relatively large proportion of copper. This copper originally is principally, if not entirely, in organic combination. But the organic copper compounds are unstable, and in very short periods of time, particularly at elevated temperatures, summer temperatures or higher, decompose with liberation of soluble copper compounds which dissociate to form ionic copper in the presence of water. Discoloration results from reaction of this ionic copper with ammonia liberated from proteins of the crab meat, more than sufficient ammonia for the reaction usually being liberated by any heating of the meat, by storage for short periods at summer temperatures and by decomposition incident to bacterial action. The discoloration brings about a change, frequently irregular through the meat, from a pleasing white to unattractive shades of gray or blue, sometimes almost black. The color change is not always evident immediately after cooking, but generally occurs within a few days or weeks, and inevitably creates an unfavorable impression upon the prospective consumer.

In heretofore customary canning processes for the meat of the Atlantic crab, the raw, and preferably live, crabs are cooked in a stem heated retort at temperatures above 200° F. for about 20 minutes so that the flesh becomes firm. The crabs are then cooled and stripped, that is, the carapace, viscera and smaller claws are removed, and the meat is picked from the larger claws and body. The picked meat thereafter is graded into white and claw sometimes washed in brine, drained and packed in cans. In the cans, the meat undergoes a further cooking to prevent bacteriological spoilage, for example under steam pressure for about one hour at about 240° F. Some discoloration, due to the formation of copper-ammonia complexes, occurs in all Atlantic crab meat packed by this canning process. Consequently, refrigeration has been preferred to canning as a means for preserving the meat of the Atlantic crab.

As a result of my investigations, I have discovered that in the live crab the copper occurs principally in the inedible portions, the muscular portions or meat containing much less copper. In cooking by heretofore customary processes, the copper becomes released and distributed throughout the body of the crab with resultant contamination of the meat. I have found, however, that a relatively short preliminary heat treatment which does not cook the crab meat or viscera substantially is sufficient to weaken the bond between certain of the inedible portions of the crab and the body, and thus permit stripping of the carapace, gills, and soft tissues of the body cavity, and that such a preliminary heat treatment does not bring about substantial contamination of the meat with copper. Hence, by stripping the crabs immediately after such preliminary heat treatment, the principal source of contamination is removed, and the tendency for the subsequently cooked meat to become discolored is much reduced. A somewhat longer preliminary heat treatment brings about sufficient change in the tissues which bind the body together that picking of the crab meat from the inedible body structure also may be carried on, again without resulting in substantially contaminating the meat with copper. My invention therefore contemplates the improvement in a process of canning the meat of the Atlantic crab which comprises subjecting the fresh, and preferably live, crabs to one or more preliminary heat treatments of relatively short duration, such heat treatment being far from sufficient to cook the crab completely and insufficient to cause decomposition of the organic copper compounds therein, removing the meat from the resulting heat treated crab, and cooking the meat out of contact with the balance of the crab.

My process may be carried out in one or more stages. In the single-stage modification, a single preliminary heat treatment, preferably in the presence of an aqueous fluid, steam or water, and enduring for from 3 to 6 minutes at a temperature ranging from 210° F. to 240° F., is employed to facilitate both stripping (i. e., detachment of carapace, gills and organs of the body cavity) and picking (i. e., removal of the balance of the bony structure from the muscular portions or meat). In the two-stage modification, a shorter first heat treatment (say 30 to 90 seconds at a temperature in the neighborhood of and preferably slightly in excess of 200° F.) is followed by stripping. The stripped crab may then be subjected to a second heat treatment sufficient to permit picking. Preferably this second heat treatment endures from 2 to 4 minutes at a temperature slightly above 212° F.

Preliminary heat treatments in both modifications should be interrupted promptly, as by prompt cooling.

In both modifications of my process, the crab meat is washed following picking and then thoroughly cooked and canned in the heretofore customary fashion. The removal of those portions of the crab containing relatively high concentrations of copper compounds before these compounds are afforded opportunity to decompose and contaminate the meat results in a lower initial production of dark meat and a canned product having improved whiteness and flavor and greatly diminishes the tendency for discoloration to occur during aging in the can. As a further safeguard against discoloration, however, the salts of aluminum, zinc or tin (without or preferably with acid) may be incorporated in the product to inhibit the formation of copper-ammonia complexes, as disclosed in U. S. Patent No. 2,027,270 granted January 7, 1936, to Carl R. Fellers.

My invention will be understood more thoroughly in the light of the following description of two presently preferred modifications thereof:

In the first, or single stage, practice of my invention, live Atlantic crabs are charged into a steam retort or "cooker" of conventional form. Steam is admitted to the retort to bring it up as promptly as possible to about 210° F. This usually consumes 3 to 10 minutes. The crabs are then exposed to heat treatment for 3 to 6 minutes at a temperature ranging from about 210° F. to about 240° F. The crabs are then cooled immediately, this being accomplished by rapidly releasing the steam pressure from the retort, removing the crabs therefrom, and spreading them on tables or the like where they are exposed to the atmosphere. As soon as the crabs are cool enough to handle they are stripped and picked, the carapace, gills vicera, and exterior and interior skeletal structure being removed and discarded. The separated meat which is congealed to the point at which it may be handled, then is cooked and subjected to further processing by heretofore known methods.

The single stage modification of my invention thus results in separation of the crab meat from the blood and visceral tissues which contain the objectionable copper before this element has had substantial opportunity to contaminate the meat. An even more prompt separation of the bulk of the inedible portions of the crab with consequent less opportunity for copper contamination, is obtained in the two stage modification of the invention. In this modification, the live crabs are exposed to steam or hot water at a temperature above about 200° F. for a period of 30 to 90 seconds, and then cooled promptly. The carapace, with attached tissues, is then removed easily by hand or with mechanical aids, and the gills and semi-solid substances remaining on the crab are removed by cutting or scraping with a knife and by flushing with water, fresh water, salt water or sea water. The balance of the crab, comprising the body meat, interior skeletal structure and the claws, is placed in a retort and heated as promptly as possible by direct action of steam. Heat treatment is continued for 2 to 4 minutes after the temperature within the retort reaches 212° F. Then the steam pressure is released; the crab is withdrawn from the retort and permitted to cool rapidly on a table. As soon as cool, the crab is picked, and the meat further processed in the known manner. Thus, the contamination of the crab meat by bacteria-laden and copper-rich viscera during picking and cooking is prevented most effectively, because generally speaking, I have found that the shorter the preliminary heat treatment which will permit removal of the bulk of the inedible portion of the crab, the better will be the color and flavor of the crab meat after canning.

I claim:

1. In a process of canning meat of the Atlantic crab which involves cooking of the meat, the improvement which comprises subjecting the fresh crab to a preliminary heat treatment in the presence of an aqueous fluid for a period ranging from 3 to 6 minutes at a temperature ranging from 210° F. to 240° F. so that the meat congeals, and separating the congealed meat from the rest of the crab prior to further cooking of the meat.

2. In the canning of meat of the Atlantic crab involving the cooking thereof, the improvement which comprises subjecting the fresh crab in the presence of an aqueous fluid to a preliminary heat treatment above about 200° F. for a period ranging from 30 to 90 seconds and removing the carapace, gills, and loosely adhering tissues of the body cavity from the crab prior to further treatment.

3. In a process for canning meat of the Atlantic crab involving the cooking of the meat and its separation from the balance of the crab, the improvement which comprises subjecting the fresh crab to a preliminary heat treatment in the presence of water for a period of from 30 to 90 seconds at a temperature slightly in excess of about 200° F., removing the carapace, gills, and loosely adhering tissues of the body cavity from the crab thus heat treated, subjecting the remainder of the crab to heat treatment in the presence of water at a temperature slightly above 212° F. for a period of 2 to 4 minutes, and thereafter removing the crab meat from the balance of the crab.

4. In a process for canning Atlantic crab meat which involves the cooking thereof, the improvement which comprises subjecting the fresh crab in the presence of an aqueous fluid to a heat treatment of from 3 to 6 minutes at a temperature ranging from 210° F. to 240° F., separating the crab meat from the heat treated crab and subjecting the separated crab meat to cooking.

5. In a process for canning meat of the Atlantic crab involving the cooking of the meat, the improvement which comprises subjecting the raw crab in the presence of water to a heat treatment at a temperature ranging from 210° F. to 240° F. for a period ranging from 3 to 6 minutes, rapidly cooling the resulting heat treated crab, separating the meat from the cooled crab and cooking the separated meat.

6. In the canning of meat of the Atlantic crab involving the cooking of the meat, the improvement which comprises subjecting the fresh crab to a preliminary heat treatment in the presence of an aqueous fluid for a period of from 30 to 90 seconds at a temperature in the neighborhood of 200° F., rapidly cooling the resulting heat treated crab and thereafter removing the carapace, gills, and loosely adhering tissues of the body cavity from the cooled crab prior to cooking the meat.

7. In the canning of meat of the Atlantic crab involving the cooking of the meat, the improvement which comprises subjecting the fresh crab to a preliminary heat treatment in the presence of an aqueous fluid for a period of 30 to 90 seconds at a temperature in the neighborhood of 200° F., removing the carapace, gills, and loosely adhering tissues of the body cavity from the resulting heat treated crab, subjecting the remainder of the crab to a heat treatment for a period of 2 to 4 minutes at a temperature ranging at 210 to 240° F., cooling the resulting heat treated remainder of the crab, separating the meat from the remainder of the crab, and cooking the separated meat.

8. In a process for canning meat of the Atlantic crab involving the cooking thereof, the improvement which comprises preventing the contamination of the meat by cooper compounds by subjecting the fresh crab to a relatively moderate preliminary heat treatment to weaken the tissues by which the portions comprising the carapace, gills and loosely adhering body tissues of the body cavity are attached to the crab, said portions being those in which the major part of the copper content of the crab are contained, and removing said copper-containing portions from the crab prior to cooking the meat thereof substantially.

STERLING G. HARRIS.